Patented Nov. 18, 1924.

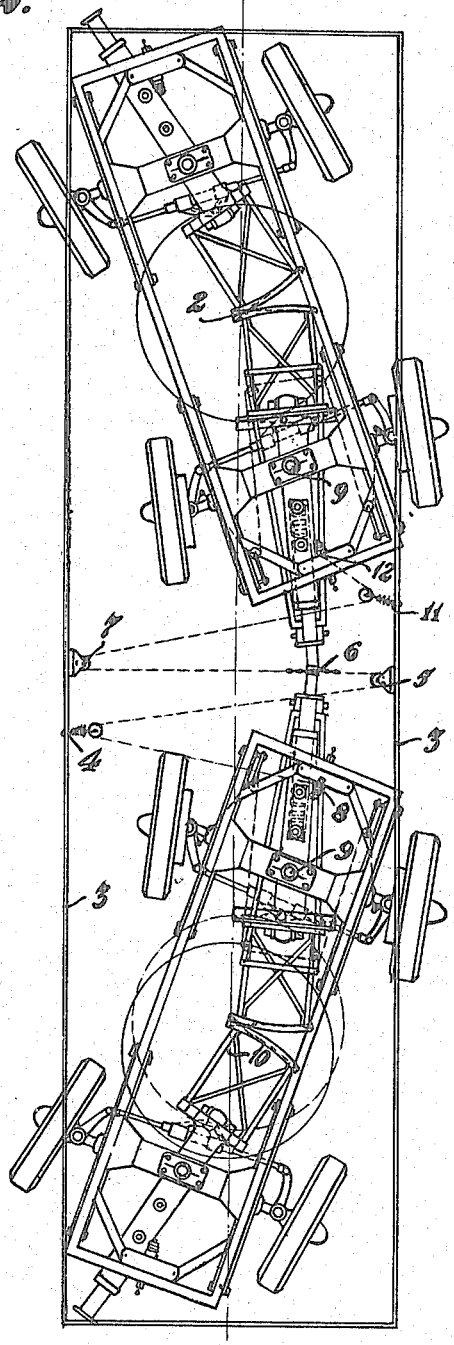

1,515,775

UNITED STATES PATENT OFFICE.

HENRI WOUTER JONKHOFF, OF SEMARANG, JAVA, DUTCH EAST INDIES.

AUTOMATIC STEERING DEVICE FOR TRACTOR TRAINS.

Application filed June 19, 1923. Serial No. 646,426.

*To all whom it may concern:*

Be it known that I, HENRI WOUTER JONKHOFF, a subject of the Queen of the Netherlands, residing at Semarang, Java, Dutch East Indies, have invented certain new and useful Improvements in Automatic Steering Devices for Tractor Trains, of which the following is a specification.

In forming tractor-trains the principal elements are the couplings between the train-elements, the couplings being not only designed with a view to tractive power but also to pressure as the full weight of the train is pushed against the strongly braked tractor when wheeling down inclines. It is clear that as soon as this occurs in curves considerable lateral pressure is exerted on the front wheels, which pressure increases according as the couplings are longer, as then they operate as levers. In automatically steerable trailers the steering buffer should therefore be deflected as little as possible as otherwise a flexure is formed which can not withstand the pushing power of the trailers so that a lateral shearing of the trailers occurs. As the semitrailer caused a much too large lever for lateral shearing it has been excluded from train-formations entirely. Instead of this semi-trailer a four-wheel trailer was attached directly behind the tractor and upon these two coupled fourwheel vehicles a common loading-surface was mounted, which at the front side was supported upon the tractor table and at the back side was supported by a turn-table which was attached centrally to the trailer-truck. This became possible by reason of the fact that the distance between the centres of these turn-tables could remain constant also in curves as it was secured to the truck by means of a sliding-device.

The attachment of the four-wheel-trailer behind the tractor should for the reasons before-mentioned be effected by a coupling of restricted length, the result of which is, however, that the trailer-wheels do not run in the track of the tractor driving-wheels for the reason that the latter have no steering-device and, therefore remain always parallel to the tractor-truck. There should therefore be found a means to impart to this short coupling-rod a horizontal movement beyond the longitudinal axis of the tractor-truck so that the steerable wheels of the following trailer are guided back automatically in the tractor-track. This operation, however, will give rise to a flexure in this coupling whereby as a lever it might become fatal as soon as pushing forces work from behind. On the one hand the coupling must, therefore, be short and nevertheless in pulling condition as a lever give an increased working for the steering device of the trailer, whereas on the other hand, in the event of pushing, the same coupling as a lever should be put out of line with the longitudinal axis in order to avoid shearing, which would occur as soon as it would have to withstand the counter-forces of the strongly braked tractor.

The invention makes provision for both operations. It may consist of a buffer or coupling rod which at its front end turns about the vertical spindle of the loading-surface passing through the tractor-table so that the buffer is also compelled to make also the vertical movement of the tractor-table. The other end projects behind the said table and to this end the trailer may be connected. The horizontal movement of this buffer is controlled by the position of the loading surface above this buffer and to which the buffer is connected as by a cable. This connection is such that as soon as the longitudinal axis of the loading surface is displaced to the left the buffer deflects to the right and the relation between these associated movements may be adjusted by removing the cable connection to the loading surface more or less from the vertical spindle in the tractor-table.

Thus the deflection in the trailing of the trailer is compensated by a larger swinging of the buffer beyond the longitudinal axis of the tractor truck so that this buffer coupling in pulling position is satisfactory.

In the event of pushing or of pressure the small angle formed between the buffer and the coupling with the trailer however gives at the same time a larger lateral pushing force. The buffer, however, will not act as a lever for these pushing forces, as this pressure is transformed by the cable-connection into traction so that the angle of incidence is then more favourable with regard to the driving-wheels.

Figure 2 is a plan view of a modification showing two trailers with a common loading-platform.

Figure 1:
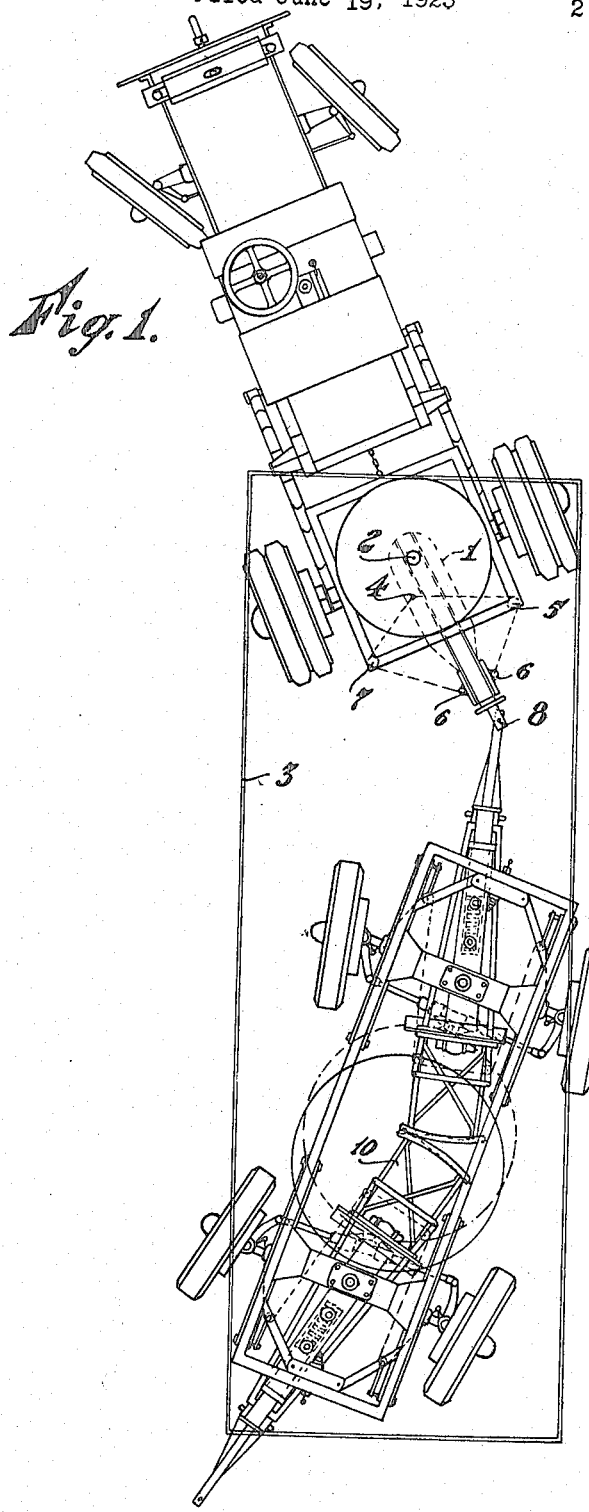
Figure 1 is a plan view of a tractor and a trailer.

With reference to the drawing the invention will now be explained by examples.

Figure 1 shows a plan view of a tractor combination (a tractor with a coupled four-wheel-trailer having a common loading surface) the tractor buffer 1 turning freely about one of the vertical spindles 2 of the loading surface 3. It is automatically maintained in the correct position by cable connections 4, 5, 6 and 4, 7, 6. These cables are connected with their ends at the points 6 to the tractor buffer. From there these connections run at the points 7 and 5 over rollers secured to the tractor truck and further are guided to the point 4 where their ends are secured to the loading surface 3 at a point located in the longitudinal axis of the loading surface.

As soon as a tractor truck places itself with respect to the trailer truck connected thereto in another direction, then a difference in direction between the longitudinal axis of the tractor truck and the longitudinal axis of the loading surface 3 arises, which latter is supported upon both vehicles. The object of the invention is to utilize this difference for the steering of the movable tractor buffer, for the horizontal direction of the latter determines the track of the following trailer.

In the attachment above described when running straight the longitudinal axis of the loading surface will coincide with the same line as the longitudinal axis of both trucks so that no steering or deflection in the direction of the buffer will be perceivable. As soon however as the point 4 in the longitudinal axis of the loading surface moves away in a curve in lateral direction from the point 5 in the tractor truck, then by reason of the fixed length of the connection 4, 5, 6, the point 6 will move to the opposite side just as much as the point 4 is moved away from the longitudinal axis of the tractor truck, while the connection 4, 7, 6 will act correspondingly in opposite direction.

In order to come to a correct relation of the required difference in buffer direction the points 6 and 4 may be chosen in different arcs of circles, which may be traced about the central point 2. The distance of point 4 from the longitudinal axis of the tractor truck on the one hand then determines in curves the deflection of point 8 outside the longitudinal axis of the tractor truck on the other hand. In this way it is obtained that the front wheels of the trailer accurately follow the track of the driving wheels of the tractor and that the cutting off in curves is avoided.

Another application of the invention is indicated in Fig. 2, showing a trailer-combination (two coupled trailers having a common loading surface). The point 6 is located in the pivot-point of the coupled trailer buffers. The location of the said point is controlled by the difference in direction between the longitudinal axis of the loading surface and the longitudinal axes of both trailer trucks which latter occupy symmetrical positions with regard to the longitudinal axes of the loading surface and in opposite directions. The positions of point 6 of this trailer combination which was first determined by the relatively short radius from point 9 is now determined by the arc of a circle from point 2 or 10, the radius of which is much larger so that even in tractor train formation, disregarding the automatic buffer steering of the trailers, this invention may also be applied and then will act as a stabilizer. It will then become possible, at higher speeds of tractor-trains, to receive the oscillation, which in coupled steering devices are transmitted always in an increased degree to the trailers, at certain points in the train formation by means of this stabilizer, which up to the present was impossible in vehicles not running on rails. Thus enormous possibilities are created for the reason that various drawbacks are removed at once which drawbacks formerly in double automatic steering devices were always experienced in train formations as soon as these moved at a higher speed than 12 or 15 kilometers per hour.

The drawing Fig. 2 illustrates this application of the invention as a stabilizer between the double acting automatic steering devices of two trailers. From the point 6 the two cables run in opposite directions to the rollers 7 and 5 which are secured to the loading-surface at equal distances from its longitudinal axis. From these points, between which point 6 can move, the connection runs to the opposite sides of the loading-surface to the points 4 and 11 where a roller cable-guide supported by a strong helical spring is connected to the loading-surface. This helical spring receives the moment which arises between the steering of the wheels in a certain direction and the altered position which the loading surface occupies with respect to the two trailer trucks. By finally attaching the connection to a certain point located in the longitudinal axis of the trailer truck the desired action is obtained.

The location of point 6 in the line 7—5 is thus determined by the distance arising between the end-points 12 and 8 on the one hand and the longitudinal axis of the loading surface on the other hand. Here it may be remarked that this displacement is always automatically effected by the traction which is exerted by the cable at the side to which the point 6 must displace itself.

I claim—

1. An automatic steering device, comprising two vehicles, a loading platform common to the vehicles, a coupling pivotally connecting the two vehicles, and a flexible connection controlling the position of the pivot point in accordance with the differences in direction of the longitudinal axes of the loading platform and the vehicles.

2. An automatic steering device, comprising two vehicles, a loading platform common to the vehicles, a coupling pivotally connecting the two vehicles, and a flexible connection between the loading surface and one of the vehicles, the connection controlling the position of the pivot point in accordance with the differences in direction, of the longitudinal axes of the loading platform and one of the vehicles.

3. An automatic steering device, comprising, a tractor, a buffer on the tractor, a four-wheel tractor pivoted to the buffer, a loading platform pivoted to the tractor and the trailer, a spindle for the loading platform, the buffer being rotatable on the spindle, two cables, each having one end connected to the buffer, and each having the other end connected to the loading surface at a point in its longitudinal axis, each cable intermediate its ends being guided over a pulley fixed to the tractor truck, whereby to automatically control the position of the buffer.

4. An automatic steering device, comprising, two trailers, a pivoted coupling therebetween, a loading platform common to the trailers, pulleys attached to the platform at equal distances from its longitudinal axis, spring supported rollers attached to the platform, and two cables, each having one end attached to the pivot point of the coupling, running over one of said pulleys and one of said rollers, the other ends of the cables being attached respectively to the one and the other trailers at points in the longitudinal axes of the trailers.

In testimony whereof I affix my signature.

HENRI WOUTER JONKHOFF.